United States Patent
Monereau et al.

(10) Patent No.: US 8,337,592 B2
(45) Date of Patent: Dec. 25, 2012

(54) PURIFICATION OR SEPARATION PROCESS USING SEVERAL OUT-OF-PHASE ADSORBERS

(75) Inventors: Christian Monereau, Paris (FR); Ingrid Bellec, La Varenne Saint Hilaire (FR)

(73) Assignee: L'Air Liquide Societe pour l'Etude et l'Exploitation des Procedes Georges Claude, Paris (FR)

( * ) Notice: Subject to any disclaimer, the term of this patent is extended or adjusted under 35 U.S.C. 154(b) by 499 days.

(21) Appl. No.: 12/521,890

(22) PCT Filed: Dec. 27, 2007

(86) PCT No.: PCT/FR2007/052627
§ 371 (c)(1),
(2), (4) Date: Nov. 20, 2009

(87) PCT Pub. No.: WO2008/087363
PCT Pub. Date: Jul. 24, 2008

(65) Prior Publication Data
US 2010/0058804 A1    Mar. 11, 2010

(30) Foreign Application Priority Data
Jan. 5, 2007 (FR) .................................. 07 52531

(51) Int. Cl.
*B01D 53/04* (2006.01)
(52) U.S. Cl. .................. 95/99; 95/125; 95/139
(58) Field of Classification Search .............. 96/115, 96/121, 130, 144; 95/96, 99, 117, 123, 125, 95/129, 135–137, 139
See application file for complete search history.

(56) References Cited

U.S. PATENT DOCUMENTS

| | | | |
|---|---|---|---|
| 5,220,797 A * | 6/1993 | Krishnamurthy et al. | 62/620 |
| 6,086,659 A * | 7/2000 | Tentarelli | 96/131 |
| 6,210,466 B1 * | 4/2001 | Whysall et al. | 95/100 |
| 6,224,651 B1 | 5/2001 | Monereau et al. | |
| 6,447,582 B1 * | 9/2002 | de Souza | 96/121 |
| 6,733,568 B2 * | 5/2004 | De-Souza et al. | 95/26 |
| 6,770,120 B2 * | 8/2004 | Neu et al. | 95/96 |
| 6,790,415 B2 * | 9/2004 | Petit et al. | 422/619 |
| 7,255,727 B2 | 8/2007 | Monereau et al. | |
| 7,641,716 B2 * | 1/2010 | Lomax et al. | 95/96 |
| 2005/0000354 A1 * | 1/2005 | Monereau | 95/96 |
| 2006/0254420 A1 * | 11/2006 | Monereau et al. | 95/96 |

FOREIGN PATENT DOCUMENTS

| | | |
|---|---|---|
| EP | 0305919 | 3/1989 |
| EP | 0903171 | 3/1999 |
| EP | 0978305 | 2/2000 |
| EP | 1004343 | 5/2000 |
| FR | 2806321 | 9/2001 |
| FR | 2841152 | 12/2003 |
| WO | 03049839 | 6/2003 |

OTHER PUBLICATIONS

PCT Search Report for PCT/FR2007/052627, mailed Sep. 2008.

* cited by examiner

*Primary Examiner* — Frank Lawrence, Jr.
(74) *Attorney, Agent, or Firm* — Elwood L. Haynes

(57) ABSTRACT

A method of purifying or separating a gas using a number of adsorbers on phase-shifted cycles, and more particularly to the purification of atmospheric air, prior to cryogenic separation of the said air by cryogenic distillation is provided. More specifically still, it relates to the purification of air with a TSA cycle using radial adsorbers.

19 Claims, 3 Drawing Sheets

PURIFICATION OR SEPARATION PROCESS USING SEVERAL OUT-OF-PHASE ADSORBERS

This application is a §371 of International PCT Application PCT/FR2007/052627, filed Dec. 27, 2007.

FIELD OF THE INVENTION

The invention relates to a method of purifying or separating a gas using a number of adsorbers on phase-shifted cycles, and more particularly to the purification of atmospheric air, prior to cryogenic separation of the said air by cryogenic distillation. More specifically still, it relates to the purification of air with a TSA cycle using radial adsorbers.

BACKGROUND

It is known that atmospheric air contains components that have to be eliminated before the said air can be let into the heat exchangers of the cold box of an air separation unit, these in particular being the carbon dioxide ($CO_2$), water vapour ($H_2O$), oxides of nitrogen and/or hydrocarbon compounds for example.

This is necessary because if the air is not pretreated in this way to eliminate its $CO_2$ and water impurities these impurities will solidify into ice during the cooling of the air to cryogenic temperatures typically of $-150°$ C. or below, and this may result in problems with the equipment, particularly the heat exchangers, the distillation columns, etc. becoming plugged.

Furthermore, it is also commonplace to at least partially eliminate the hydrocarbons and oxides of nitrogen impurities likely to be present in the air in order to prevent them from becoming too highly concentrated in the bottom of the distillation column or columns and thus guard against any risk of equipment damage.

At the present time, this air pretreatment is performed, according to circumstance, using the TSA (temperature swing adsorption) method or using the PSA (pressure swing adsorption) method; what PSA method means is actual PSA methods proper, VSA (vacuum swing adsorption) methods, VPSA methods and the like.

The invention applies to the various methods and units that use radial adsorbers, operating in TSA mode, that is to say with an increase in temperature during the regeneration.

Conventionally, an air purification TSA method cycle involves the following steps:
a) purifying the air by adsorbing impurities at superatmospheric pressure and at ambient temperature,
b) depressurizing the adsorber down to atmospheric pressure,
c) regenerating the adsorbent at atmospheric pressure, particularly using the residual gases, typically impure nitrogen from an air separation unit and heated to a temperature usually of between 100 and $250°$ C. by means of one or more heat exchangers,
d) cooling the adsorbent to ambient temperature, particularly by continuing to let into it the said residual gas from the air separation unit, but not heated this time,
e) repressurizing the adsorber with purified air from, for example, another adsorber that is in the production phase.

In general, the air pretreatment devices comprise two adsorbers, operating in alternation, that is to say that one of the adsorbers is in the production phase while the other is in the regeneration phase.

The production phase corresponds to the purification of the gaseous mixture by adsorption of the impurities.

The regeneration phase corresponds to the desorption of the impurities held on the adsorbent during the adsorption step, by heating the adsorbent using the residual gases heated to a temperature of between $100°$ C. and $250°$ C. It involves the steps of depressurizing, heating, cooling and repressurizing.

A step of paralleling the two adsorbers, of varying duration, that is to say lasting for a few seconds to several minutes, is generally added to the start or end of the regeneration phase.

Such TSA methods for purifying air are described in particular in documents U.S. Pat. No. 3,738,084 and FR-A-7725845.

As soon as the flow rates to be purified become high, it is known practice to use radial adsorbers as taught by document U.S. Pat. No. 4,541,851 or in patent EP-A-1,638,669.

Radial adsorbers allow large quantities of fluid, particularly of atmospheric air, to be purified by adsorption reliably and repeatedly while at the same time maintaining a good distribution of the treated fluid and fluid flow velocities that are compatible with the mechanical properties of the adsorbent particles used.

DETAILED DESCRIPTION OF THE INVENTION

Figure 1:
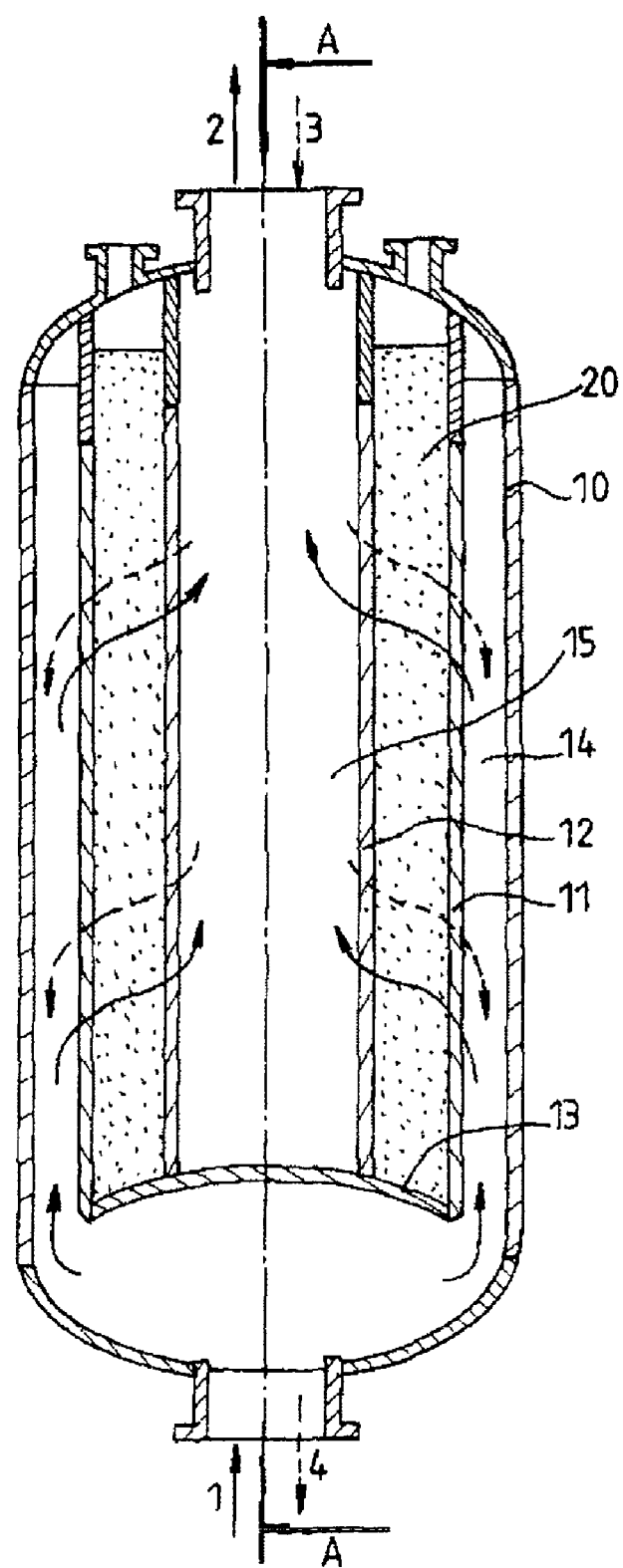
FIG. 1 is a schematic illustration of the operation of a radial adsorber.

For a further understanding of the nature and objects for the present invention, reference should be made to the detailed description, taken in conjunction with the accompanying drawing, in which like elements are given the same or analogous reference numbers and wherein:

The operation of a radial adsorber is depicted in FIG. 1.

The fluid 1 to be purified or separated enters the radial adsorber 10 at the bottom part, passes through the adsorbent mass 20 centripetally or centrifugally according to circumstance, and the product leaves from the upper part 2. During regeneration, the regeneration fluid 3 enters in counter-current manner via the top part, desorbs the impurities contained in the adsorbent mass 20 and the residual gas 4 leaves from the bottom part.

The adsorber 10 itself is made up of a cylindrical shell ring of vertical axis AA and of two end pieces. The adsorbent mass is held in place by means of a perforated external grating 11 and of an internal grating 12, likewise perforated, which are fixed to the upper end piece and to a solid sheet 13 in the lower part. The gas 1 circulates vertically at the periphery in the external free zone 14 between the cylindrical shell ring and the external grating, passes radially through the adsorbent mass 20, then circulates vertically in the internal free zone 15 before leaving the adsorber via the top. Regeneration takes place in the opposite direction.

In the above description, the gas that is to be purified during the adsorption phase circulates from the periphery towards the centre: adsorption is then said to be centripetal. Corresponding regeneration then takes place centrifugally, that is to say from the centre towards the outside. This is the most widespread configuration but radial adsorbers can be used in the same way with opposite directions of flow, that is to say that, for example, during adsorption, the gas to be treated will flow from the inside outwards whereas, during regeneration, the regeneration gas will flow from the outside inwards. One other possible arrangement is to add a circular sealing disc to split the adsorbent mass into two parts. It is then possible in one and the same radial adsorber to have, in the adsorption phase, for example, centrifugal flow through a first volume of adsorbent, followed by centripetal flow in the upper volume of adsorbent.

In terms of the equipment surrounding the radial adsorbers, namely the distillation columns, the cylindrical reactors, the standard superposed bed adsorbers, that is to say ones which are cylindrical on a vertical axis, and the essentially cylindrical reservoirs and volumes, the cost conventionally varies approximately with the size (the volume or quantity of fluid to be treated) raised to the power of 0.7 to 0.9, generally on average to the power of about 0.8, which means that it makes better economical sense to build one large unit than two half-sized units.

Consider a conventional adsorber of the cylindrical type with a vertical axis. If the flow rate of charging gas is to be increased for the same efficiency, that is to say essentially for the same pressure drops, the passage cross section needs to be increased while at the same time maintaining the same height of adsorbent. However, building large-diameter vertical-axis cylindrical adsorbers leads to problems with dead volumes and gas distribution.

Horizontal axis cylindrical adsorbers, on the other hand, can be extended to accommodate large flow rates by adding shell ring sections. However, this widely used type of adsorber has disadvantages such as the distribution of gas within the adsorbent mass because of the longer paths along the shell ring or such as substantial heat losses which are due to the large area of heat exchange between the adsorbent and the external surroundings.

This being the case, radial adsorbers have the special feature that they can easily be extended in terms of size and used to treat very high gas flow rates. Unlike most fluid treating equipment, an increase in flow rate essentially involves increasing the height of the equipment rather than the diameter thereof.

That being so, it is commonplace in the prior art to increase the size of the radial adsorbers when the flow rates that are to be purified increase.

For example, a radial adsorber 3 meters in diameter and 7 meters tall can treat 200 000 $Nm^3/h$ of air at ambient temperature and at 6 bar absolute. In order to treat twice the flow rate, namely 400 000 $Nm^3/h$ with the same performance, it would be possible to use an adsorber 3.75 m in diameter and 11 to 12 meters tall. The diameter is increased by just 25% while the height is increased by more than 60%.

There is no technical objection to creating adsorbers of the order of 6 to 7 meters in diameter and 20 to 30 m tall. By way of comparison, there are reactors or distillation columns of this size or larger.

However, inside a radial adsorber, the gas flows both longitudinally through the internal and external distribution spaces and radially through the adsorbent mass. This double path leads to problems of gas distribution when the size of radial adsorbers is increased. Because pressure drops vary essentially with the square of the velocity, the variation in pressure between the top and the bottom of the adsorber would be approximately eight times greater for a double-capacity adsorber if the same diameter of shell ring were kept with, in effect, a fourfold increase corresponding to the doubling of the flow rate and a twofold increase corresponding to the doubling of the path length. In order to maintain a correct distribution of gas through the adsorbent bed over the entire height of the adsorber, it then becomes necessary to enlarge the external passage cross section by a factor in excess of 2.

That means overall that the volume allocated to the gas distribution zones (the internal and external free volumes) increases in greater proportion to the increase in flow rates. As a result, the total volume of the adsorber, that is to say the volume of the adsorbent mass and the distribution volumes, is also increased more than simply in proportion with the flow rates.

Thus, treating higher flow rates by increasing the size of the adsorbers leads to problems with pressure losses and gas distribution which lead to an enlargement of the diameter and, as a result, to an increase in the volume and weight, making handling trickier.

However, it will be noted that this cannot be solved simply by installing a plurality of small-sized radial adsorbers, that is to say by installing, for example, several two-meter-diameter adsorbers instead of a four-meter-diameter adsorber because an adsorber four meters in diameter is still easy to handle and to construct in a great many workshops. The volume gain is not in itself sufficient reason for replacing a medium-sized adsorber with several small adsorbers. This is one of the reasons why the abovementioned problem has not hitherto come to light.

In short, increasing the size of the radial adsorbers beyond a diameter of four meters when the flow rate that is to be purified increases is not the best technical and economical solution to adopt.

The use of methods comprising a greater number of adsorbers as practised to date does not solve the problem addressed here either. It is known practice to carry out purification cycles of the TSA type comprising an adsorption period and a regeneration period and using three adsorbers.

The first set of circumstances involves using one adsorber in purification and two adsorbers in regeneration. One example of this mode of operation corresponds to the drying and halting of the acidic constituents ($CO_2$, $H_2S$) of natural gas. An outline of such a method may be found for example in chapter 11.2 (page 359) of "Principles of Adsorption and Adsorption Processes" by D. M. Ruthven. A cycle such as this gives twice as much available time for regenerating by comparison with a conventional unit comprising just two adsorbers, with a fixed adsorption time. This essentially makes it possible to minimize the flow rate of gas needed for regeneration.

The second set of circumstances that may arise corresponds to the opposite: two adsorbers in adsorption and one adsorber in regeneration. This is the special case when the adsorption kinetics are slow and substantial volumes of adsorbent are needed to halt an impurity.

The regeneration period for a purification unit of the TSA type comprises a heating step, almost always a cooling step, and possibly depressurization/repressurization steps if regeneration is performed at a pressure different from that of adsorption and/or paralleling of the regenerated adsorber with the adsorber at the end of the adsorption step. This paralleling may last a few seconds, if it is simply a matter of ensuring continuity of production while the supply and production valves of the said adsorbers are being opened/closed, or may last a few minutes to tens of minutes if there is a case for stabilizing the temperatures or composition of the regenerated bottle. This paralleling may correspond to the circulating of a halved flow rate through each of the two adsorbers or the circulating of different percentages depending on the adsorbers. In general, paralleling is the name given to a step during which the gas to be purified is fed to at least two adsorbers which are not at the same point in the cycle, for example one adsorber at the end of the production phase and one adsorber which has just been regenerated and repressurized.

On the whole, for such cycles, the duration of the adsorption period is different from the duration of the regeneration period.

In order to provide a more precise description of the adsorption cycles, use is made of the idea of phase time $\Delta\phi$ and cycle time T.

A cycle comprising N adsorbers comprises N phases of duration equal to $\Delta\phi$, and the cycle time T, which corresponds to the time needed for an adsorber to return to the same point in the pressure cycle, is then equal to N phase times $\Delta\phi$.

On that premise, one problem which arises is that of improving gas treatment methods and units involving radial adsorbers when the volumetric flow rates that are to be treated become high, typically at least 100 000 m³/h.

SUMMARY OF THE INVENTION

The solution of the invention is a method, operating in TSA mode, of purifying or separating a gaseous mixture containing at least two constituents, in which use is made of n radial adsorbers with $n \geq 4$, each adsorber being subjected to a pressure cycle of given duration T comprising a production period and a regeneration period, characterized in that the pressure cycles of all the adsorbers are phase shifted from one another by a phase shift of duration $x \cdot \Delta\phi$ with $1 \leq x \leq (n-1)$ and $\Delta\phi = T/n$, where $\Delta\phi$ denotes the phase time.

Depending on circumstances, the method according to the invention may exhibit one of the following features:
- at each moment in the pressure cycle, at least two adsorbers are in the adsorption phase;
- periodically, at least three adsorbers are, at a given moment, in the adsorption phase;
- the purification method uses n radial adsorbers with n=4 or n=6 on a cycle involving n/2 production phases and n/2 regeneration phases;
- the purification method uses five adsorbers on a cycle involving three production phases and two regeneration phases or two production phases and three regeneration phases;
- use is made of a heater that operates continuously, during the regeneration period of an adsorber;
- the duration of the heating phase to regenerate an adsorber is approximately equal to a phase time $\Delta\phi$;
- use is made, during the heating step of the regeneration period, of a heating gas flow rate that differs from the flow rate of cooling gas used at the end of the regeneration period;
- the flow rates of heating and cooling gas passing through a given adsorber are modified during the course of the cycle;
- the phase time is between 15 and 90 minutes;
- the hourly volumetric flow rate of gas to be treated in the adsorption unit is in excess of 100 000 m³/h;
- the pressure of the gas to be treated is between 2 and 35 bar, preferably between 3 and 8 bar, absolute;
- the duration of a cycle is between 90 and 600 minutes;
- the gaseous mixture is air and in that the carbon dioxide and the water contained in the air are eliminated in the production period;
- the gaseous mixture contains predominantly $CO_2$ and at least one impurity, particularly water and/or oxides of nitrogen and/or sulphur-containing products;
- each adsorber contains activated alumina and/or zeolite and/or silica gel and/or activated carbon by way of adsorbent;
- the gas from the production period undergoes cryogenic distillation.

The invention also relates to an installation for purifying and separating a gaseous mixture, comprising n radial adsorbers with $n \geq 4$, each adsorber operating in TSA mode and being subjected to a pressure cycle comprising a production period and a regeneration period, characterized in that each adsorber is fed via one or more pipes which are connected to a source of gas that is to be purified and to a source of regeneration gas and which are equipped with individual valves the opening and closing of which are controlled via a control device, so that the pressure cycles of all the adsorbers are phase-shifted from one another by a phase shift of duration $x \cdot \Delta\phi$ with $1 \leq x \leq (n-1)$ and $\Delta\phi = T/n$.

Preferably, the height of the shell ring of each adsorber is in excess of 10 meters, preferably between 12 and 25 meters, and/or each adsorber has a diameter ranging between 4 and 6.5 meters.

Starting out from the observation that increasing the size of a radial adsorber presents problems inherent to this technology, namely that it increases the percentage of dead volumes devoted to distribution of gas with respect to the useful volume, the invention relies on the use of a plurality of smaller-sized adsorbers and, more specifically, on arranging them in a pressure and temperature cycle that leads to improvements over the solution proposed in the prior art, these improvements being on top of the saving in investment attached to the reduction in the overall volume of the adsorbers.

In a simple and preferred embodiment according to the invention, two adsorbers on a two-phase cycle are replaced with four adsorbers of lower overall volume on a four-phase cycle such that the total duration of the cycle and the total volume of adsorbent are essentially identical.

More generally, the switch is from an n-adsorber unit to an N=2n-adsorber unit while maintaining the total adsorbent volume and performance, including the pressure drops in adsorption and regeneration.

Figure 2:
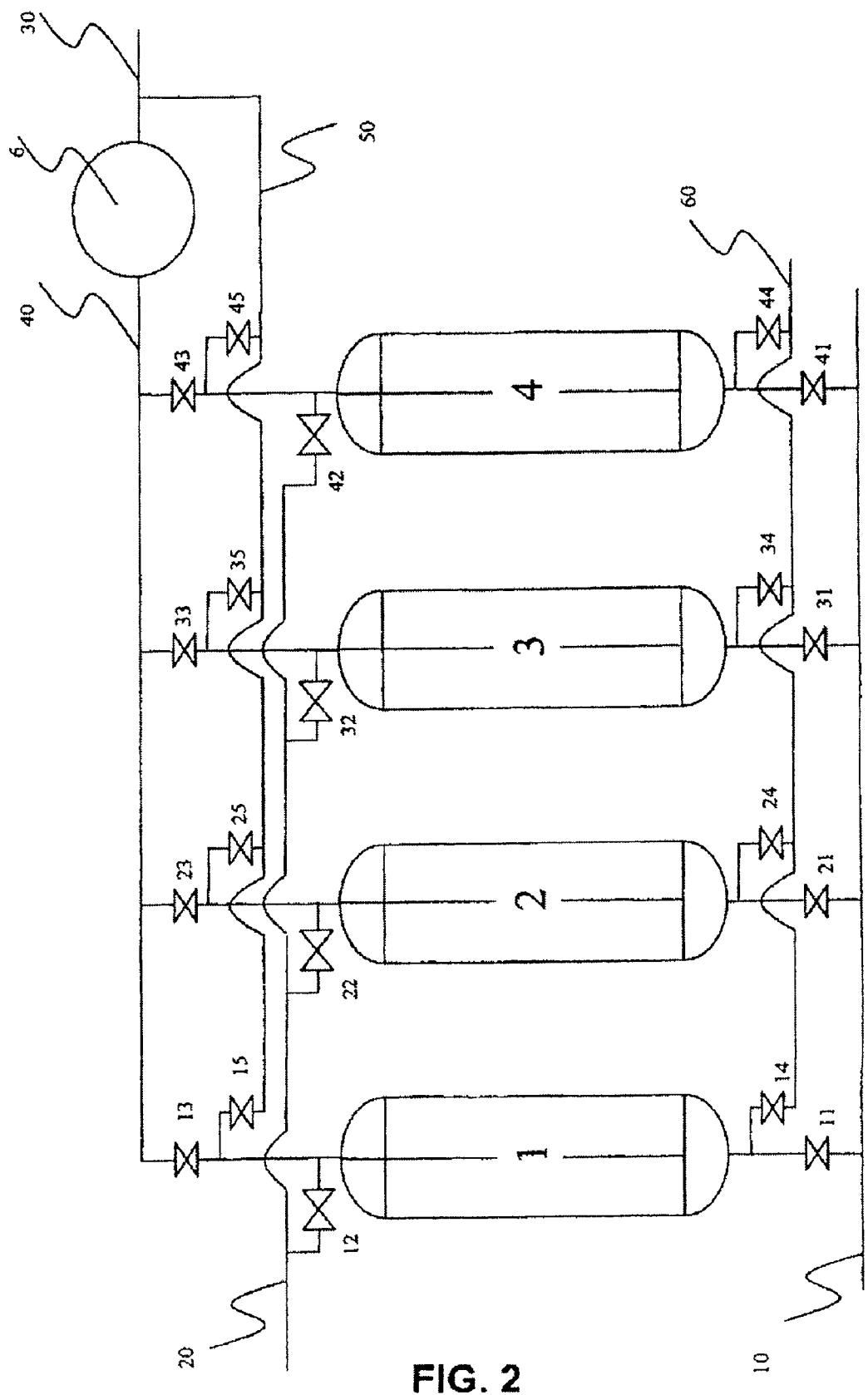
FIG. 2 is a schematic illustration of a purification unit with four radial adsorbers and which therefore has a cycle made up of 4 phases.

The invention will be described in greater detail with reference to the attached FIGS. 2 and 3 which are given purely by way of illustration.

One embodiment according to the invention will be described by means of FIG. 2 which depicts a purification unit with four radial adsorbers and which therefore has a cycle made up of 4 phases, these being 2 adsorption phases and two regeneration phases.

For a better understanding, it will be assumed that the radial adsorber 1 begins the first adsorption phase and that the radial adsorber 2 begins the second adsorption phase.

The gas 10 to be purified is supplied in parallel to the adsorbers 1, 2 via the valves 11 and 21. The purified gas 20 is collected via the valves 12 and 22.

During the same time, the adsorber 3 which has completed its production period is isolated from the main circuits by closing the valves 31 and 32 and is then depressurized via the valve 34 before beginning its regeneration period. During this step, the regeneration gas 30 is, for a proportion 40 of it, heated in the regeneration heater 6 and then flows into the adsorber 3 via the valves 33 and 34.

Simultaneously and during the same time period, the adsorber 4 will finish its heating substep then be cooled by the unheated regeneration gas 50 via the valves 45 and 44.

Thus, the adsorber 1 follows, with a phase shift of one phase time $\Delta\phi$, the same pressure cycle as the adsorber 2. The same is true of adsorber 2 with respect to adsorber 3 and of adsorber 3 with respect to adsorber 4.

Each adsorber during the course of the cycle therefore successively follows two production phases and then two regeneration phases.

Figure 3:
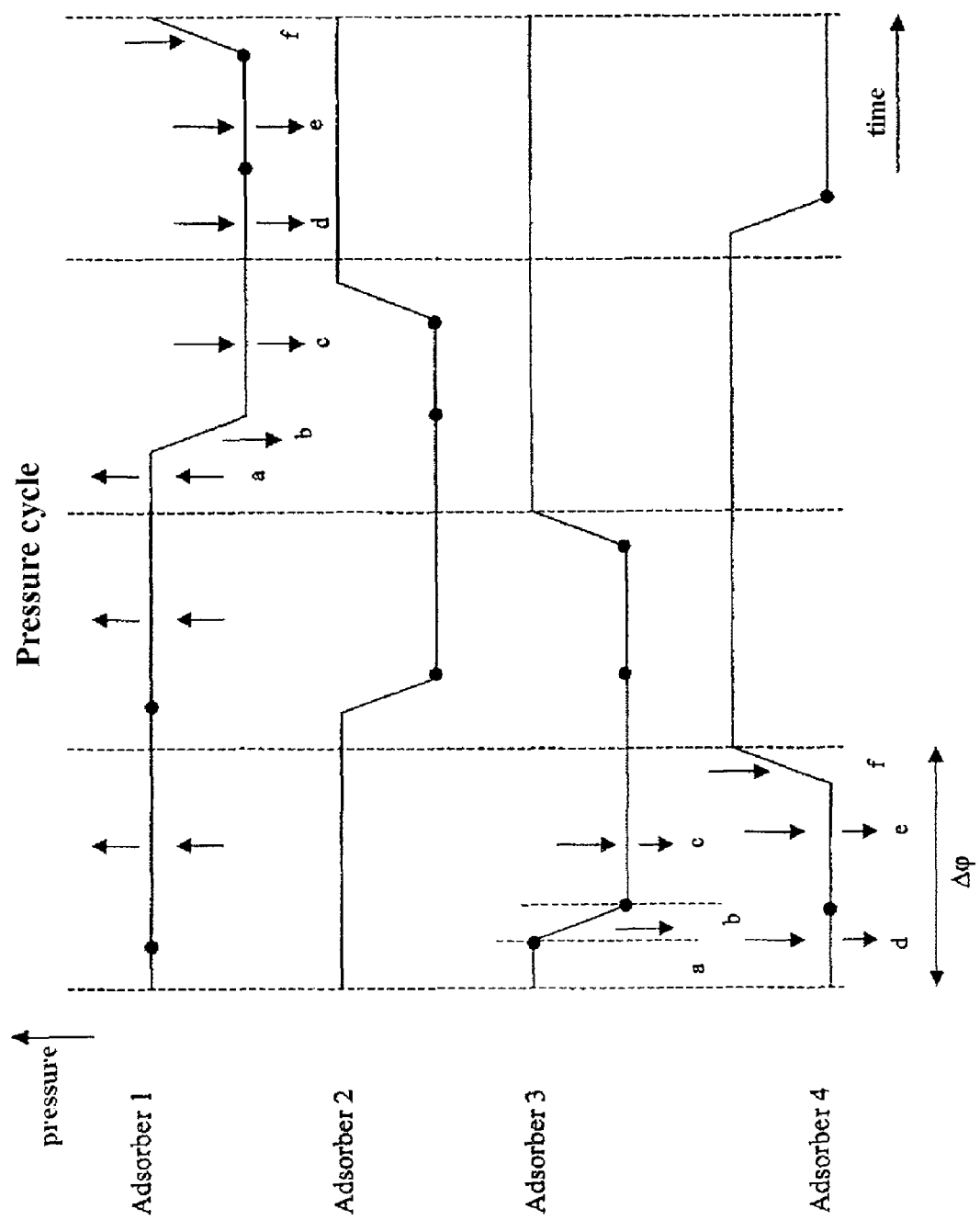
FIG. 3 is a schematic illustration of one example of a 4-adsorber unit, the pressure cycle of each of the adsorbers being represented as a function of time.

FIG. 3 depicts one example of a 4-adsorber unit, the pressure cycle of each of the adsorbers being represented as a function of time. The cycle comprises 4 phases and the pressure cycles of all the adsorbers are phase-shifted from one another by a phase shift of duration $x\Delta\phi$ with $1 \leq x \leq 3$ and $\Delta\phi = T/4$, that is to say phase-shifted by T/4, 2 T/4 or 3 T/4.

In this example, each phase of the cycle is represented for each of the adsorbers. As indicated above, the production (adsorption) and regeneration periods each occur during two phase times. Furthermore, the first regeneration phase includes, on the one hand, the steps of paralleling a, depressurizing b and heating c which take place during a phase time $\Delta\phi$ and, on the other hand, a second regeneration phase with a substep of heating d and steps of cooling e and repressurizing f which likewise take place during a phase time $\Delta\phi$.

There are a number of advantages of this mode of operation over a method according to the prior art which consists in using just 2 adsorbers or over a method inspired for example by the treatment of acid gases and comprising 3 adsorbers.

According to the invention, during production, each adsorber has only half the supply flow rate passed through it. For a fixed adsorption duration, it will therefore require half as much adsorbent and, because it is a radial adsorber, it will be less than half the size, in terms of dimensions, of a single adsorber performing the same function. This, as explained above, is because of the dead volumes needed to ensure a good distribution of gas when flow through the said adsorber is both longitudinal (or axial) and radial.

Returning to the example of units treating 200 000 and 400 000 Nm³/h respectively, it can be seen that it is possible to save of the order of 25% on the overall volume of the adsorbers by using the recommended solution.

This saving in adsorber size can be obtained if use is made of a cycle comprising 3 adsorbers: two adsorbers doing adsorption and one doing regeneration. By comparison with a standard cycle for the purification of air prior to cryogenic separation, that means that, for a given adsorption time, it is possible to regenerate twice as quickly as is achieved in standard practice. That would entail high regeneration flow rates and create pressure drops such that it is not seriously conceivable for everyday applications.

Aside from the saving in overall adsorber volume, there are other advantages that follow from the application of the invention. It is known that switching an adsorber that has just been regenerated and repressurized into production mode is accompanied by an increase in the temperature ($\Delta t$) of the purified gas for a period lasting from a few minutes to a few tens of minutes. That and the consequences of this heating on the method downstream are detailed in document EP-A-1347817.

By combining cycles that are identical but phase-shifted, this effect is automatically limited. This is particularly true of the example chosen and described in FIG. 3.

Specifically, when the adsorber 1 begins its first production step, the adsorber 2 is itself beginning its second production step and it has therefore long got over the effect of this heating. Because the purified gas is made up in equal shares of gases from adsorbers 1 and 2, the initial increase in temperature is no more than ($\Delta t' = \Delta t/2$). The paralleling time can therefore be recouped in order, for example, to lengthen the repressurization step accordingly, that is to say that, for a given quantity of repressurization gas, it is possible to reduce the flow rate of purified gas or of gas that is to be purified needed to do so. That makes it possible to reduce the flow rate fluctuations and thereby disrupt the cryogenic unit downstream to a lesser extent.

These repressurizations obviously occur more frequently than in the standard cycle, but it is the amplitude of the variations in flow rate far more than their frequency that can cause the trouble.

Conversely, as proposed in the cycle of FIG. 3, that may make it possible, by adding a step of paralleling (a) the adsorber (3) that is completing its second production phase, to reduce still further the overall thermal effect ($\Delta t'' = \Delta t/3$), thus allowing operation, for example, at higher pressure, and therefore with greater thermal effect, which is something that could not be done with a standard cycle unless a coolant were added between the outlet from the purification stage and the inlet to the cold box.

Likewise, a phase that may incorporate a substep of production corresponding, for example, to a paralleling is termed a regeneration phase provided that this production substep is shorter than half the phase time $\Delta\phi$. In practice, the paralleling substep generally lasts less than 10% of the phase time $\Delta\phi$.

It will be noted that because operation is cyclic, it is possible to choose any point of the cycle as the cycle starting point and to describe the entire cycle from this point onwards, creating 4 entirely arbitrary phases. Thus, for example, still using the diagram of FIG. 3, if we begin to describe the cycle in the middle of the first production phase, we then get a first production phase, a second phase comprising a production step, a paralleling step (a), a depressurizing step (b) and a heating step, a third phase with heating and cooling steps and a fourth and final phase with the end of the cooling step, the repressurization step and the first production step.

In practice, when mention is made of cycles and phases, this means the most logical representation with production phases and regeneration phases and, in particular, with phase ends corresponding to key points in the cycle and movements of valves.

With these 4 adsorbers it is also possible to contrive for the regeneration heater 6 to be in continuous operation, something which, by eliminating the periods of non-operation and of heat loss, is beneficial to the power consumption and mechanical integrity of the said exchanger over time. To do that, all that is required in the cycle of FIG. 3 which has been proposed by way of example is for the heating step to be extended during the course of the phase that follows the phase in which heating began. The duration of substep (d) which continues the heating is such that the duration of (c+d) corresponds to a phase time $\Delta\phi$. It can be seen in the example that this means that substep (d) needs to be equal to the sum of the substeps corresponding to paralleling and depressurizing.

The combination of the four cycles in FIG. 3 is given by way of example. It may be modified without thereby departing from the scope of the invention which consists in using, for TSA-type purification, that is to say purification comprising a phase in which at least some of the impurities are desorbed by circulating a gas that is hotter than the gas that is to be purified, a purification unit comprising n adsorbers, with $n \geq 4$, and in having them operate on cycles of duration T comprising n phases, phase-shifted from one another by a phase shift of duration $x\Delta\phi$ with $1 \leq x \leq (n-1)$ and $\Delta\phi = T/n$.

For example, paralleling can be done in the same phase time as repressurizing, just after the latter. It is also possible to add a waiting time between the end of repressurizing and the start of production.

It will be noted that the flow rate of heating gas (40) may differ from the flow rate of cooling gas (50). These flow rates can be kept essentially constant during the duration of the heating and cooling steps, or may be modified during the course of these very steps. It may, for example, be beneficial to keep pressure drops across the adsorbers constant, which to a first approximation amounts to increasing the flow rates when the mean temperature of the adsorber is coldest and, on the other hand, to decreasing them when the mean temperature is hotter.

Nonetheless, if the flow rate of residual gas available for regeneration is very high, for example if the product being recovered is essentially oxygen rather than nitrogen, it may now become possible to regenerate in a time that is a little shorter than the time used for adsorption as a result of the invention, that is to say as a result of using a plurality ($N \geqq 4$) of adsorbers.

More particularly, if the total adsorption duration for an adsorber is 120 minutes for example and it can then be depressurized, regenerated and repressurized in 80 minutes, it is possible to adopt a phase time of 40 minutes and to have a method operating with 5 adsorbers: 3 in adsorption and 2 in regeneration while at the same time keeping the regeneration pressure drops within a range that is still acceptable. Because each adsorber is equal in volume to one third of the standard adsorber that would be used to treat the entire flow rate, what that amounts to is installing only 5/6 of the volume of adsorbent normally needed in the standard case.

Indeed, by comparison with the cycles used that involve 3 adsorbers, 2 in adsorption and one in regeneration, the fact of now using a plurality of adsorbers allows certain opportunities to be put to better use. With the 3-adsorber system, and still with a total adsorption duration of 120 minutes (2 lots of 60 minutes), the regeneration step should now take place over 60 minutes.

According to the invention, still for the same total adsorption duration (3 times 40 minutes), 80 minutes (2 lots of 40 minutes) are now available as previously stated. Given the time needed for depressurizing and repressurizing, and the respective adsorber sizes of 3-adsorber and 5-adsorber cycles, for example 20 and 10 minutes respectively, the duration available for heating and cooling is, in practice, very much shorter in the case of a 3-adsorber setup (40 minutes in the above example) than in a 5-adsorber setup (70 minutes). This last solution therefore makes it possible, in relative terms, to use lower regeneration flow rates, that is to say, above all, to operate at markedly lower pressure drops in regeneration, even though these pressure drops will be greater than those that would be obtained with a 4-adsorber or 6-adsorber unit. In other words, the fact of using a plurality of adsorbers may, in some circumstances, make it possible to save on one adsorber while retaining advantageous solutions that would be impossible to implement outside of the scope of the invention because of the lesser flexibility associated with a lower number of adsorbers.

All the cycles described are generally managed automatically by an instrumentation and control system. This type of control can be fairly elaborate and for example adapt the durations of the steps and/or the regeneration conditions to suit the operating conditions.

It would be appreciated that, for the higher flow rates, the choice of installing a plurality of small adsorbers leads to an appreciable saving.

This invention may for example be applied to the purification of air at flow rates in excess of 500 000 $Nm^3/h$, at pressures of 3 to 8 bar abs and at temperatures of 5 to 45° C.

In particular, the method of the invention is recommended for purifying atmospheric air before it is distilled and separated at cryogenic temperatures within a cryogenic air separation unit, so as to produce nitrogen and/or oxygen in liquid, gaseous or some other form It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of purification or separation of a gaseous mixture containing at least two constituents, with a TSA system, wherein said TSA system comprises n radial adsorbers, with $n \geqq 4$, wherein each adsorber operating in a pressure cycle of duration T, said pressure cycle comprising a production period and a regeneration period, wherein the pressure cycles of all the adsorbers are phase shifted from one another by a phase shift of duration $x \cdot \Delta\phi$, where $1 \leqq x \leqq (n-1)$ and $\Delta \leqq = T/n$, wherein a regeneration heater is used continuously, during the regeneration period of an adsorber.

2. The method of claim 1, wherein at each moment in the pressure cycle, at least two adsorbers are in the adsorption phase.

3. The method of claim 1, wherein periodically, at least three adsorbers are in the adsorption phase.

4. The method of claim 1, wherein the purification method uses n radial adsorbers with n=4 on a cycle involving n/2 production phases and n/2 regeneration phases.

5. The method of claim 1, wherein the purification method uses n radial adsorbers with n=6 on a cycle involving n/2 production phases and n/2 regeneration phases.

6. The method of claim 1, wherein the purification method uses five adsorbers on a cycle involving three production phases and two regeneration phases or two production phases and three regeneration phases.

7. The method of claim 1, wherein the duration of the heating phase to regenerate an adsorber is approximately equal to the phase time $\Delta\phi$.

8. The method of claim 1, wherein use is made, during the heating step of the regeneration period, of a heating gas flow rate that differs from the flow rate of cooling gas used at the end of the regeneration period.

9. The method of claim 8, wherein the flow rates of heating and/or cooling gas passing through a given adsorber are modified during the course of the cycle.

10. The method of claim 1, wherein the phase time is between about 15 and about 90 minutes.

11. The method of claim 1, wherein the hourly volumetric flow rate of gas to be treated in the adsorption unit is in excess of 100 000 $m^3/h$.

12. The method of claim 1, wherein the pressure of the gas to be treated is between about 2 and about 35 bar, absolute.

13. The method of claim 1, wherein the pressure of the gas to be treated is between about 3 and about 8 bar, absolute.

14. The method of claim 1, wherein the duration of a cycle is between about 90 and about 600 minutes.

15. The method of claim 1, wherein the gaseous mixture is air and in that the carbon dioxide and the water contained in the air are eliminated in the production period.

16. The method of claim 1, wherein the gaseous mixture contains predominantly $CO_2$ and at least one impurity.

17. The method of claim 16, wherein the impurity comprises water and/or oxides of nitrogen and/or sulphur-containing products.

18. The method of claim 1, wherein each adsorber contains activated alumina and/or zeolite and/or silica gel and/or activated carbon by way of adsorbent.

19. The method of claim 1, wherein the gas from the production phase undergoes cryogenic distillation.

* * * * *